April 11, 1950     R. J. ASPEEK     2,503,539
POWER-OPERATED HAND TOOL FOR
SCRAPING AND FEATHERING
Filed June 6, 1946
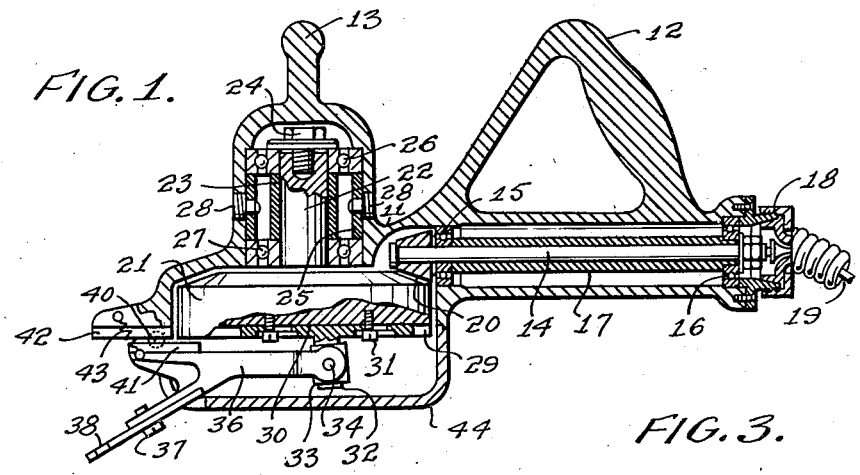
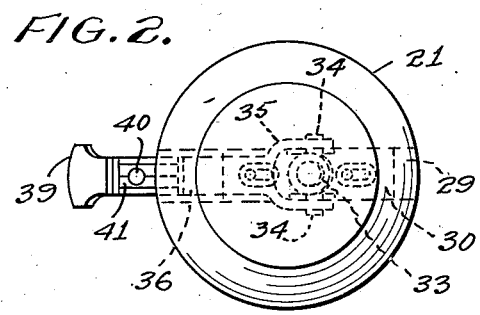
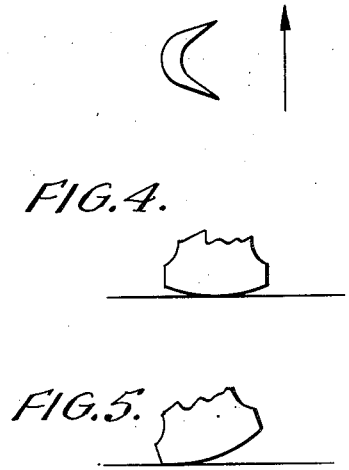
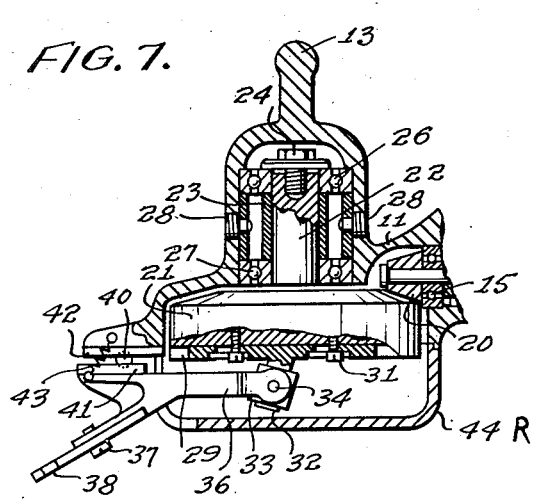
INVENTOR:
REGINALD JAMES ASPEEK
BY Patented Apr. 11, 1950

2,503,539

UNITED STATES PATENT OFFICE 2,503,539

POWER-OPERATED HAND TOOL FOR SCRAPING AND FEATHERING

Reginald James Aspeek, East Ham, England, assignor to Coborn Engineering Company Limited, Barkingside, Essex, England Application June 6, 1946, Serial No. 674,783
In Great Britain June 14, 1945

7 Claims. (Cl. 41—1)

This invention relates to power-operated hand tools and particularly to a power-operated hand tool for scraping and "feathering" the surface of metal sheets.

It is common practice in forming flat metal surfaces to scrape the surface of the metal with a hand tool in those areas which are above the flat datum level. Thus a metal sheet, having been brought to a state of approximate flatness may be brought into contact with a master plate of known accuracy of flatness, the master plate being coated with a transferable coloured layer. Then those areas of the metal sheet which are above the datum level of flatness "take" the colour by transference from the master plate. These areas are scraped down and the test of flatness repeated until the metal sheet takes the colour substantially uniformly from the master plate, thus indicating that it has acquired the same degree of flatness as the master plate.

It is also common practice to finish the surface of metal objects, for example, parts of machine tools, with a slight surface irregularity known as "feathering" from its appearance. This is commonly done by hand, the operator by a wrist movement so guiding the scraping tool that the "feathered" appearance is obtained.

Both the hand scraping and the feathering operations referred to above are highly skilled operations and the operator only acquired a degree of skill which yields a satisfactory product after long experience.

According to the present invention a power-operated hand tool for scraping or "feathering" comprises a blade with a substantially arcuate cutting edge, means for reciprocating said blade along a line normal to the centre of said cutting edge, means for simultaneously causing said blade to rock about said line as axis, said means including a flywheel of substantial mass, a housing for said means and a power-driving connection thereto.

Since the cutting operation using the tool exerts a substantial reactionary thrust on the operating mechanism it is desirable that the whole tool should have substantial weight consistent with its being readily handled by the operator. A net weight of about 12 to 17 lbs. is generally suitable but lower net weights may be employed if the reciprocating movement is relatively short and/or the speed of the reciprocating movement is relatively high.

A preferred method of effecting the combined reciprocating and rocking motion of the blade is to secure the blade in a holder connected to an eccentric crank pin secured to one face of the flywheel, the crank pin being set at an angle to the normal, i. e. by using a so-called "wobble" crank pin. The holder is then located in a trunnion fitted on the crank pin, the trunnion permitting the rocking motion. In this construction the eccentricity of the crank pin causes the reciprocating movement while the inclination of the crank pin introduces the rocking motion. The same system may also be set up to reverse these functions, i. e. so that the eccentricity of the crank pin introduces the rocking motion and the inclination of the crank pin causes the reciprocating movement.

A specific form of this invention which has been found very suitable is illustrated in the accompanying drawings in which Figure 1 is a diagrammatic cross-section through the whole tool, showing the tool blade in a rearward position.

Figure 2 is a diagrammatic plan of part of the tool.

Figures 3, 4, 5 and 6 diagrammatically illustrate the movement of the cutting blade and the shape of the cut obtained.

Fig. 7 is somewhat similar to Fig. 1 and shows the blade of the tool disposed in a forward position.

Referring to Figures 1 and 2 of these drawings the tool comprises a body casing 11 provided with two handles 12 and 13 adapted to be grasped by the operator. The handle 13 is set at right angles to the handle 12. Within the body casing 11 is located a shaft 14 running in bearings 15 and 16. These bearings are separated by a sleeve 17 and the shaft 14 is connected via a connection 18 to a flexible shaft 19 which may be connected to a power supply.

Secured to the innermost end of the shaft 14 is a driving member in the form of a truncated cone 20. This is intended to drive by friction and may conveniently be made of a plastic such as "Bakelite." The cone 20 engages with a flywheel 21. The flywheel 21 has an upwardly projecting shaft 22 which is located in a sleeve 23 to which it is locked by a bolt 24. The sleeve 23 is located within a second sleeve 25, rotating within it on ball races 26 and 27. This second sleeve 25 is locked to the body 11 by bolts 28. The bearings 26 and 27 are so designed that they carry the weight of the flywheel 21.

The lower surface of the flywheel 21 is provided with a slot 29 in which a slide member 30 may be adjusted by means of screws 31. The slide member 30 carries a crank pin 32. The crank pin 32 may thus, by adjustment of the position of the slide member 30 in the slot 29, be given any desired degree of eccentricity. The crank pin 32 is set at a small angle to the axis of the flywheel 21.

The crank pin 32 is mounted for free rotation in a bush 33 secured by trunnions 34 across the fork 35 of a blade holding member 36. To the other end of the member 36 is secured, by a screw 37, a cutting blade 38 having an arcuate cutting edge, 39.

The member 36 is mounted for reciprocating movement on a single ball bearing 40 mounted between a pair of V-shaped grooves 41 and 42, groove 41 on the member 36 and groove 42 in the body casing 11. Springs 43 anchored at one end to the body casing 11 and at the other end to the blade holding member 36, hold the blade member and body casing in juxtaposition.

The lower part 44 of the body casing 11 is cut away to allow for movement of the member 36 and is removable to enable the interior of the tool to be assembled, adjusted or inspected.

In operation, rotation of the shaft 19 is transmitted through the shaft 14 to the cone 20 and thus to the flywheel 21. The resulting movement of the crank pin 32 causes the member 36 to reciprocate and also to rock about the line of reciprocation, thus imparting to the blade 38 a reciprocating movement combined with a rocking movement about a line normal to its direction of reciprocation.

The actual movement of the cutting blade is illustrated in Figures 4, 5 and 6 of the drawings. Figure 4 shews the blade at the commencement of its forward stroke, Figure 5 shews the blade at its mid-position and Figure 6 shews the blade at the end of its stroke. The blade rocks similarly on its return movement but of course does not exert any cutting action. The shape of the cut obtained (in the direction of the arrow) is diagrammatically indicated in Figure 3 and it is such that the depression formed by the cut grades off imperceptibly into the main surface of the metal, leaving no sharp edges.

It is found in practice that a general purpose tool according to this invention may conveniently be designed so that the reciprocation is of the order of 300–500 strokes per minute, the length of the reciprocation being from about ⅜" to 1¼". The inclination of the crank pin may conveniently be about 2 degrees to the axis of the flywheel. A flywheel of substantial mass is required and the net weight of the tool may be about 15 lbs. However, if a smaller tool is desired, as for special work in confined spaces, the weight may be reduced, for example, to 7 to 12 lbs. and the speed of reciprocation increased to say 500 to 1500 strokes per minute and the length of the stroke reduced, say to ¼ to ⅝".

The cutting blade, as stated above, has a substantially arcuate cutting edge. This need not be an absolutely true arc but may if desired have a greater degree of curvature towards the ends of the arc than at its centre. An arc of about 4 inch radius has been found very suitable. It is not absolutely necessary for the blade to be symmetrical since, as will be apparent from Figures 4, 5 and 6 one half of the blade does not exert a cutting action. Nevertheless it is convenient to make the blade symmetrical as it may then be removed from the blade-holding member, turned over and replaced, thus bringing the other half of it into cutting operation. The cutter blade is conveniently a tungsten tipped blade.

Various modifications of the specific design described above and illustrated in the accompanying drawings may be made within the scope of this invention. For example the flywheel may be made to rotate on a horizontal axis and may be spring-loaded to take up some of the reactionary thrust of the cutting blade. Further, although in the tool illustrated in the drawings the bearing for the blade-holding member is a single ball, any other form of bearing which will permit the three movements of the member, i. e. reciprocating, rocking, and side-to-side, all resultant on the movement of the crank pin, may be employed. Thus a suitable alternative is a tubular sleeve bearing mounted on a vertical trunnion.

In the case where the eccentricty of the crank pin is responsible for the rocking movement and the inclination of the crank pin is responsible for the reciprocating movement, there is no side-to-side movement of the blade-holding member and a bearing catering only for the reciprocating and rocking movements may be employed.

What I claim is:

1. A power-operated hand tool for scraping or feathering which comprises a blade with a substantially arcuate cutting edge, a flywheel of substantial mass, an eccentrically mounted crank pin located on the face of said flywheel, a blade-holding member connecting said crank pin and said blade, whereby rotation of said flywheel causes a reciprocating movement of said member and therefore of said blade on a line normal to the centre of its cutting edge, said crank pin being disposed at a small angle to the axis of said flywheel whereby rotation of said flywheel causes simultaneously a rocking movement of said blade about said line as axis, a housing for said flywheel, crank pin and blade-holding member and a power driving connection to said flywheel.

2. A power-operated hand tool for scraping or feathering which comprises a blade with a substantially arcuate cutting edge, a flywheel of substantial mass, an eccentrically mounted crank pin located on the face of said flywheel, a blade-holding member connecting said crank pin and said blade, whereby rotation of said flywheel causes a reciprocating movement of said member and therefore of said blade on a line normal to the centre of its cutting edge, said crank-pin being disposed at a small angle to the axis of said flywheel and said blade-holding member being connected to said crank pin by a trunnion connection, whereby rotation of said flywheel causes simultaneously a rocking movement of said blade, permitted by said trunnion, about said line as axis, a housing for said flywheel, crank pin, blade-holding member and trunnion connection, and a power driving connection to said flywheel.

3. A power-operated hand tool for scraping or feathering which comprises a blade with a substantially arcuate cutting edge, a flywheel of substantial mass, an eccentrically mounted crank pin located on the face of said flywheel, a blade-holding member connecting said crank pin and said blade, whereby rotation of said flywheel causes a reciprocating movement of said member and therefore of said blade on a line normal to the centre of its cutting edge, said crank pin being disposed at a small angle to the axis of said flywheel and said blade-holding member being connected to said crank pin by a trunnion connection, whereby rotation of said flywheel causes simultaneously a rocking movement of said blade, permitted by said trunnion, about said line as axis, said blade-holding member being mounted for movement in a bearing permitting the reciprocation, rocking and side-to-side movement thereof, a housing for said flywheel, crank pin, blade-holding member and trunnion connection, and a power driving connection to said flywheel.

4. A power-operated hand tool for scraping or feathering which comprises a blade with a substantially arcuate cutting edge, a flywheel of substantial mass, an eccentrically mounted crank pin located on the face of said flywheel, a blade-holding member connecting said crank pin and said blade, whereby rotation of said flywheel causes a reciprocating movement of said member and therefore of said blade on a line normal to the centre of its cutting edge, said crank pin being disposed at a small angle to the axis of said flywheel and said blade-holding member being connected to said crank pin by a trunnion connection, whereby rotation of said flywheel causes simultaneously a rocking movement of said blade, permitted by said trunnion, about said line as axis, said blade-holding member being mounted for movement on a single ball bearing moving between V tracks, a housing for said flywheel, crank pin, blade-holding member and trunnion connection, and a power driving connection to said flywheel.

5. A power-operated hand tool for scraping or feathering which comprises a blade with a substantially arcuate cutting edge, a flywheel of substantial mass, an eccentrically mounted crank pin located on the face of said flywheel, a blade-holding member connecting said crank pin and said blade, whereby rotation of said flywheel causes a reciprocating movement of said member and therefore of said blade, on a line normal to the centre of its cutting edge, said crank pin being disposed at a small angle to the axis of said flywheel and said blade-holding member being connected to said crank pin by a trunnion connection, whereby rotation of said flywheel causes simultaneously a rocking movement of said blade, permitted by said trunnion, about said line as axis, a housing for said flywheel, crank pin, blade-holding member and trunnion connection, and a power driving connection to said flywheel, said tool being so dimensioned and designed as to permit a reciprocating stroke of length between $3/8''$ and $1 1/4''$, a speed of reciprocation of the order of 300 to 500 strokes per minute, and so as to have a net weight of the order of 12 to 17 lbs.

6. A power-operated hand tool for scraping or feathering which comprises a blade with a substantially arcuate cutting edge, a flywheel of substantial mass, an eccentrically mounted crank pin located on the face of said flywheel, a blade-holding member connecting said crank pin and said blade, whereby rotation of said flywheel causes a reciprocating movement of said member and therefore of said blade, on a line normal to the centre of its cutting edge, said crank pin being disposed at a small angle to the axis of said flywheel and said blade-holding member being connected to said crank pin by a trunnion connection, whereby rotation of said flywheel causes simultaneously a rocking movement of said blade, permitted by said trunnion, about said line as axis, a housing for said flywheel, crank pin, blade-holding member and trunnion connection and a power driving connection to said flywheel, said tool being so dimensioned and designed as to permit a reciprocating stroke of length between $1/4''$ to $5/8''$, a speed of reciprocation of the order of 500 to 1500 strokes per minute and so as to have a net weight of 7 to 12 lbs.

7. A power operated hand tool for scraping or feathering, which includes a blade having a substantially arcuate cutting edge; a fly wheel of substantial mass mounted rotatably; a crank pin eccentrically mounted on the face of the fly wheel and disposed at a small angle to the central axis of the latter; a blade-holding member interconnecting the crank pin and the blade in such manner that the eccentricity of said crank pin and its angular disposition with respect to the central axis of said fly wheel are effective upon rotation of the fly wheel to cause a simultaneous reciprocation of the blade along a line normal to the center of its cutting edge and a rocking movement of said blade about an axis coinciding with said line; a housing for said fly wheel, crank pin and blade-holding member; and a power driving connection to said fly wheel for rotating the same.

REGINALD JAMES ASPEEK.

REFERENCES CITED

The following references are of record in the file of this patent:

UNITED STATES PATENTS

| Number | Name | Date |
|---|---|---|
| 1,315,964 | Jantsch | Sept. 16, 1919 |
| 1,617,924 | Russell | Feb. 15, 1927 |
| 1,898,411 | Watts | Feb. 21, 1933 |